United States Patent Office.

CARL J. H. F. KLEEMANN, OF NEW YORK, N. Y., ASSIGNOR OF ONE-HALF HIS RIGHT TO ARNOLD C. FRANCK, OF SAME PLACE.

Letters Patent No. 112,154, dated February 28, 1871.

IMPROVEMENT IN COMPOSITIONS FOR POLISHING.

The Schedule referred to in these Letters Patent and making part of the same.

*To all whom it may concern:*

Be it known that I, CARL J. H. F. KLEEMANN, of New York city, in the county of New York and State of New York, have invented certain new and useful Improvements in Polishing Materials; and I do hereby declare that the following is a full and exact description thereof.

My invention consists in a combination of Armenian bole, (which is an earthy mineral, resembling clay in structure, and consisting essentially of silica, alumina, and red oxide of iron,) with oxalic acid, for the purpose of obtaining a material which shall be more suitable than any yet invented for cleaning and polishing the various metals.

I am aware that oxalic acid has been frequently used for this purpose, in combination with rotten-stone and other calcareous materials, but it has never, to my knowledge, been combined with Armenian bole.

Of all the known species of bole, the Armenian is by far the most suitable for the purpose named, and when used in a state of minute division, it forms a most excellent cleansing or polishing material for all the metals, gold, silver, &c. It leaves behind it no minute scratches upon the surface of the metal.

Combined with oxalic acid, its efficiency is increased fourfold.

Armenian bole, moroever, is the only kind which does not combine with acids for the evolution of carbonic-acid gas, as does chalk and other calcareous substances. The combination which I propose to use, therefore, retains its virtue for any length of time, and does not change its constitution from the action of atmospheric or other causes.

Having thus described the nature of my invention, I will now proceed to describe the mode by which the manufacture of my "polish" may best be carried into effect.

Take of finely triturated Armenian bole one part, and mix this with ten parts of water, in which one part of oxalic acid has been previously dissolved. The mixture is then heated to the boiling-point, so as to drive off the gas evolved by the action of the acid upon the ferruginous equivalents, or red oxide of the bole. This boiling also volatilizes and precipitates other impurities frequently contained in the bole.

The mixture is constantly stirred during its preparation, and when this is completed it is poured, while still hot, into small-sized paneled bottles, (say of four-ounce capacity each.)

When the liquid has stood for a short while it has a transparent green color, while the sediment, that is, the Armenian bole, for the preparation is merely a solution, and not a chemical combination, appears slightly discolored.

The preparation is now ready for use.

I do not confine myself, however, to the exact quantities or method of mixing the ingredients, as under certain conditions it may be found advisable to make some slight modifications of the process.

Claims.

That which I claim as new, and desire to secure by Letters Patent, is—

1. The combination of Armenian bole, oxalic acid, and water, as a polish for metals and metallic substances.

2. The manufactured article, as set forth in my specification.

C. J. H. F. KLEEMANN.

Witnesses:
L. IMMEN,
I. HAHN.